April 29, 1958 J. B. DYER 2,832,226
WINDSHIELD WIPER MECHANISM
Filed Aug. 24, 1953 3 Sheets-Sheet 1
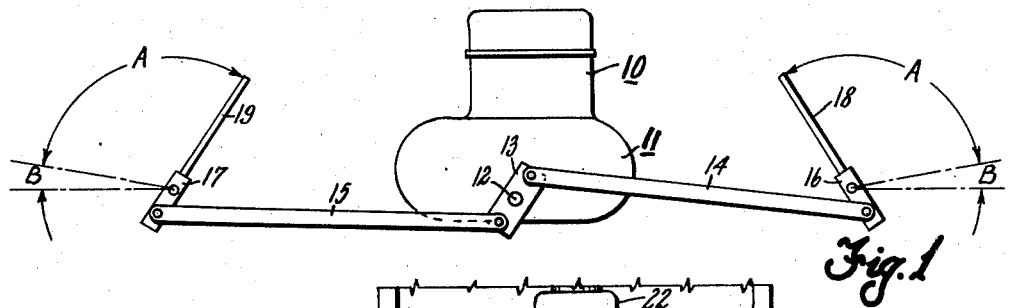
Fig. 1
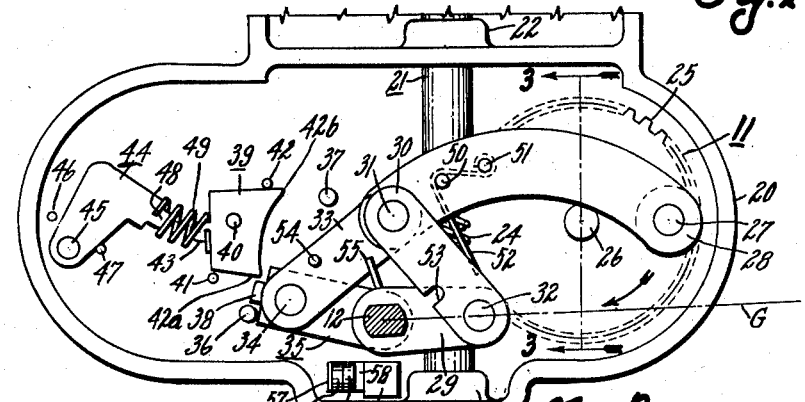
Fig. 2
Fig. 3
Fig. 4
INVENTOR.
JOHN B. DYER
BY George H. Strickland
HIS ATTORNEY April 29, 1958    J. B. DYER    2,832,226
WINDSHIELD WIPER MECHANISM
Filed Aug. 24, 1953    3 Sheets-Sheet 2

INVENTOR.
JOHN B. DYER
BY George H. Strickland
HIS ATTORNEY

April 29, 1958     J. B. DYER     2,832,226

WINDSHIELD WIPER MECHANISM

Filed Aug. 24, 1953     3 Sheets-Sheet 3

INVENTOR.
JOHN B. DYER

BY George H. Strickland

HIS ATTORNEY

United States Patent Office 2,832,226
Patented Apr. 29, 1958

2,832,226

WINDSHIELD WIPER MECHANISM

John B. Dyer, New York, N. Y., assignor to General Motors Corporation, Detroit, Mich., a corporation of Delaware Application August 24, 1953, Serial No. 376,033

19 Claims. (Cl. 74—75)

This invention pertains generally to a mechanical movement for converting rotary movement into oscillatory movement with means to vary the amplitude of oscillation imparted to a driven member by a rotatable driving member and, thereafter, maintaining the oscillatable driven member stationary during continued rotation of the driving member. More particularly, this invention relates to windshield wiper actuating mechanism incorporating such a mechanical movement.

Power driven windshield wipers are inherently superior to suction actuated wipers in many respects. However, vehicle manufacturers have been reluctant to adopt the power driven wiper mechanisms, which are available, due to the difference in cost and the inability of most mechanisms to park the wiper blades out of the normal range of vision in the manner vehicle operators have become accustomed to with suction actuated wipers. Moreover, the actuating mechanisms which do provide means for parking the wiper blades are subject to erratic operation with varying surface conditions of the windshield. It has long been recognized that the only practical solution to this problem resolves itself into the employment of an actuating mechanism wherein the wiper blades are driven into the parked position, after which the driving means are deenergized, or inactivated. Heretofore, it has been proposed to employ either a clutch or reversible rotating driving means to accomplish this result, but, in both of these arrangements the cost is prohibitive. Accordingly, among my objects are the provision of a mechanical movement especially adapted for actuating windshield wipers; the provision of a mechanical movement including means for varying the amplitude of oscillation imparted to a driven member and simultaneously therewith adjusting the mechanism so that continued rotation of the driving member will not alter the position of the driven member; the further provision of simplified control means for operating windshield wiper actuating mechanism employing the aforesaid mechanical movement; and the still further provision of means for automatically inactivating the driving member when the wiper blades are moved out of the normal range of vision to the parked position.

The aforementioned and other objects are accomplished in the present invention by employing a compound linkage arrangement for converting rotary motion into oscillatory motion, with means to adjust the compound linkage so as to increase the amplitude of oscillation at one end of the stroke and, thereafter, preclude movement of the driven member during continued rotation of the driving member. Specifically, the mechanical movement includes a connecting rod, one end of which is pivotally connected to a crank pin which is eccentrically carried by a rotatable driving member. Thus, the rotatable driving member, in effect, constitutes a crank for imparting movement to the connecting rod. In the disclosed embodiment, the rotatable driving member is driven by a unidirectional electric motor. However, it is to be understood that the use of an electric motor is only exemplary, and is not to be construed as a limitation since it is obvious that the rotatable crank member could be driven by numerous other means.

The compound linkage includes an operating link and a setting, or adjusting, link. The operating and adjusting links are pivotally interconnected, and the free end of the connecting rod is connected at the point of pivotal connection between the two links such that during rotation of the driving member, swinging forces are applied at the point of pivotal connection between the two links. The operating link is also pivotally connected to a radially extending arm of the driven member, or shaft. The other end of the setting, or adjusting, link is pivotally connected to one end of a link, the other end of which is rotatably journaled on the driven shaft. The pivot point connection of the adjusting link, which is carried by the link is movable or adjustable, as will be described more fully hereinafter. The end of the link which carries the movable pivot connection for the setting link has formed thereon a lug, opposite sides of which are engageable with opposite ends of a retaining and locating element which determines the position of the link, and, hence, the position of the movable pivot point of the setting link. The locating element for the link is pivotally mounted in a housing in which the motion converting mechanism is disposed. The locating element is movable about its pivotal connection between predetermined limits within the housing, movement of the element being effected by pivoted operating element which is operatively connected with the locating element through an off-center, or eccentrically mounted spring.

The oscillatable driven shaft carries a pin, which is adapted to actuate a parking switch when the wiper blades have been moved to the parked position, as determined by the increase in the amplitude of oscillation imparted to the shaft at one end of its stroke. The parking switch is constituted by a pair of normally engageable contacts which are carried by leaf springs, and the oscillatable shaft carried pin is adapted to engage one of the leaf springs so as to separate the contacts and open the parking switch when the oscillatable shaft is moved to the parked position. The connecting rod carries a spring device, the setting link carries an upstanding pin, and the operating link is formed with a slot, the functions of which will appear more fully hereinafter.

In order to accomplish the objective of parking the wiper blades out of the normal range of vision, by increasing or varying the amplitude of oscillation adjacent one end of the wiping stroke, the locating element for the link is adjusted from a running position to a parking position by the operating element. The locating element, in so moving, frees the link for movement due to the forces produced by the connecting rod during rotation of the driving member, and, accordingly, the link will be moved towards the driving member during movement of the connecting rod between its dead center positions. As the link moves angularly about the oscillatable driven shaft, the position of the movable pivot point of the adjusting link is varied, or displaced, so as to adjust the compound linkage so that a greater amplitude of oscillation will be imparted to the driven shaft adjacent one end of its stroke. In displacing the movable pivot point of the setting, or adjusting, link, the angular relationship between a line intersecting the axes of the driving and driven members, and a line intersecting the pivot point connections of the connecting rod, is varied. With the compound linkage arrangement disclosed, all of the links are of fixed physical length. In any event, the extent of movement produced by the connecting rod, which is imparted to the driven member by the operating link, may be varied by varying the position of the movable pivot point of the adjusting link.

In the disclosed embodiment, the force for displacing the movable pivot point of the adjusting link is derived from the rotating driving member, or more specifically from the moving connecting rod. The housing for the motion converting mechanism carries a pair of stop pins, which limit movement of the link, and, hence, the movable pivot point of the adjusting link, by the connecting rod. When the locating element is moved from its running position to its parking position, and the link is moved towards the driving member, the locating element will retain the link in the parked position to thereby increase the amplitude of oscillation imparted to the driven member, and, thereafter, the pivotal connection between the operating link and the driven shaft arm will be moved into axial alignment with the movable pivot point of the adjusting link, at which time, continued rotation of the driving member will impart no further movement to the driven member, which will remain stationary in the parked position. This result obtains inasmuch as the operating link and the setting link merely swing, or pivot, about the coinciding, axially aligned centers of the movable pivot point for the adjusting link and the pivot point connection between the operating link and the driven shaft arm, as their common pivotal connection with the connecting rod is moved by the connecting rod upon rotation of the driving member. Thus, no movement will be imparted to the driven shaft and the compound linkage may be termed "declutched" or a free swinging linkage system. Accordingly, continued rotation of the driving member to a standstill due to coasting motor inertia will not alter the parked position of the wiper blades, the desirability and advantages of which are readily apparent.

The pivot points of the setting link and the operating link are maintained in axial alignment by the cooperative setting link pin and operating link slot. Coincidentally with movement of the driven shaft to the parked position, the shaft carried pin will open the parking switch to deenergize the motor, which, as noted hereinbefore, is free to coast to a standstill without altering the position of the wiper blades. Upon initiating wiper operation, the locating element is moved to the running position and the motor is energized by suitable switch means. During rotation of the crank pin, the connecting rod will be moved to a position where the spring device carried thereby will engage the setting link and urge it towards its running position. Thereafter, continued rotation of the driving member will result in forces being imparted to the adjusting link and pivot point carrying link through the connecting rod, which will move the pivot point carrying link to its running position where it will be retained by the locating element. In this manner, the movable pivot point of the adjusting link will be positioned so that the amplitude of oscillation imparted to the driven shaft will be of fixed magnitude and oscillatable shaft carried pin will permit the parking switch to close.

Further objects and advantages of the present invention will be apparent from the following description, reference being had to the accompanying drawings wherein a preferred embodiment of the present invention is clearly shown and wherein similar reference characters denote similar parts throughout the several views.

In the drawings:

Fig. 1 is a diagrammatic view of a typical windshield wiper arrangement employing the actuating mechanism of this invention.

Fig. 2 is a fragmentary view of the actuating mechanism housing, with the cover removed, and depicting the mechanism in the running position at one end of the wiping stroke.

Fig. 3 is a sectional view taken along line 3—3 of Fig. 2.

Fig. 4 is a view similar to Fig. 2, illustrating the mechanism in the running position at the other end of the wiping stroke.

Figure 5:
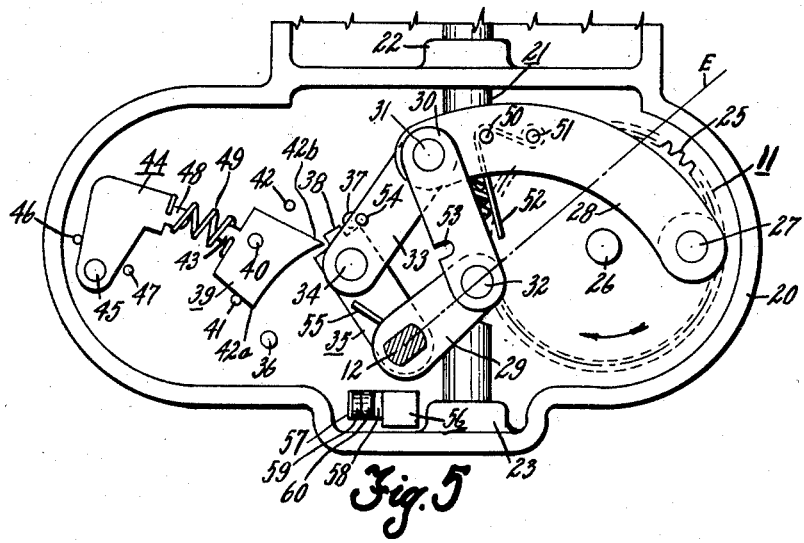
Fig. 5 is a view similar to Fig. 2, illustrating the mechanism as it is going into the parked position.

With particular reference to Fig. 1, the actuating mechanism is shown including a unidirectional direct current motor 10, a portion of the housing thereof being formed integral with the housing of the motion converting mechanism, indicated generally by the numeral 11. Projecting from the motion converting mechanism housing is a driven shaft 12 having attached thereto a crank plate 13 to which links 14 and 15 are pivotally connected. Link 14 is also pivotally connected to an actuating arm 16 for a wiper blade 18, while link 15 is pivotally connected to an actuating arm 17 for a wiper blade 19. The shaft 12 is adapted for oscillation by the motion converting mechanism 11 through a fixed arc, which defines the wiping strokes A of the blades 18 and 19. In addition, the motion converting mechanism 11 may be adjusted so as to increase the amplitude of oscillation imparted to the shaft 12 so as to move the wiper blades 18 and 19 throughout the angle B adjacent one end of their wiping strokes to a parked position, in which the wiper blades are preferably disposed in contiguous relation to windshield cowl structure, not shown.

Referring more particularly to Figures 2 through 4, the mechanical movement, or motion converting mechanism, will be described. The motion converting mechanism is contained within a housing 20 into which the armature shaft 21 of the electric motor extends. The shaft 21 may be supported by bearing means, indicated generally by the numerals 22 and 23, within the housing 20. In addition, a portion of the shaft 21 is formed to constitute a worm 24, which engages a worm gear, or wheel, 25 that is rotatably supported within the housing 20 by any suitable bearing means, not shown. The worm gear 25 is attached to a shaft 26 and carries a bearing 27 eccentrically disposed with respect to the axis of the worm gear, the bearing 27 constituting a crank pin. A connecting rod, or pitman arm 28 has one end thereof pivotally connected with the crank pin 27, in consequence of which the connecting rod will be continuously operated upon rotation of the worm gear. In Figures 2 and 4 the connecting rod 28 is shown in its two dead center positions. The other end of the connecting rod extends adjacent to the oscillatable driven member, or shaft 12, which projects out of the housing 20 for connection with transmission means for imparting movement to spaced wiper blades, as is shown in Fig. 1.

The wiper actuating shaft 12 has attached thereto within the housing 20, an arm 29, which arm extends substantially radially therefrom. The ends of the arm 29 and the connecting rod 28 are interconnected by an operating link 30, the link 30 having pivotal connection with the connecting rod 28 at 31, and pivotal connection with the arm 29 at 32. The mechanical movement thus far described constitutes a compound linkage arrangement for converting rotary motion of the worm gear 25, or driving member, into fixed magnitude oscillatory motion of the shaft 12.

In order to increase, or vary, the amplitude of oscillatory movement imparted to the driven member 12 by the compound linkage aforedescribed, means are provided for varying the operating characteristics of the compound linkage. The increase in the amplitude of oscillation imparted to the driven member 12 need only be adjacent one end of the normal wiping stroke, since the increased oscillatory movement is only required to move the wiper blades to a parked position out of the normal range of vision. The means for accomplishing this result include a setting, or adjusting, link 33, one end of which is pivotally connected at 31 to the point of pivotal connection between the operating link 30 and the connecting rod 28. The other end of the setting link 33 is carried by a pivot 34, which may be displaced within the housing 20 so as to vary the effective operating length of the connecting rod 28 by altering the angular relationship between a line C, which intersects the pivotal connections of connecting rod 28, and a line D, which intersects the axes of the driving and driven members, 25 and 12. Thus, it may be said that the link 33 has a movable pivot point connection at one end thereof. The pivot point 34 is carried by a link 35, the link 35 being rotatably supported on the driven shaft 12. The link 35 is permitted to swing about the shaft 12 between predetermined limit positions, as defined by stop pins 36 and 37, which are carried by the housing 20. The end of the link which carries the pivot point 34 is formed with a lug 38, opposite sides of which are engageable with the stop pins 36 and 37.

A locating and retaining element 39 for the link 35 is pivotally mounted at 40 to the housing 20. The locating element 39 is movable between predetermined limit positions within the housing as determined by a pair of stop pins 41 and 42. The surface of the element 39, which is disposed in contiguous relation to the end of link 35, is concave, the radius of which permits movement of the link 35 from the position shown in Fig. 2 to the position shown in Fig. 5. The other surface of the element 39 is provided with a projection 43, which is opposite relative to the pivot 40. The locating element 39 is movable about its pivotal connection 40 by means of an operating element 44, which is pivoted at 45 to the housing 20. The operating element 44 is manually movable about its pivot point 45 between limits defined by stop pins 46 and 47, which are carried by the housing 20. The operating element 44 is also provided with a projection 48, and a spring 49 has opposite ends received by the projections 43 and 48 of the elements 39 and 44, respectively. As the projection 43 is located eccentrically with regard to the pivot point 40 of the element 39, it will be appreciated that pivotal movement of the element 44 will effect movement of the element 39. The arrangement of the element 39 and the link 35 is such that sufficient clearance is provided at all times between lug 38 and stop pins 36 and 37 to permit end portions 42a and 42b of the element to move past the lug 38.

The connecting rod 28 has extending therefrom a pair of pins 50 and 51, which support a leaf spring device 52, the function of which will appear more fully hereinafter. The operating link 30 is formed with a slot 53 in one edge thereof, which slot is adapted to receive an upstanding pin 54 carried by the setting link 33 when the movable pivot point 34 of the setting link 33 is adjusted in a manner to be described. The extending arm 29 of the oscillatable shaft 12 carries a pin 55, which is adapted to operate a parking switch 56 mounted in the housing 20. The parking switch is constituted by a pair of spring leaf members 57 and 58, which are pivoted to the housing 20 and carry contacts 59 and 60. When the oscillatable shaft 12 is moved to the parked position in a manner to be described, the pin 55 engages leaf spring 58 and separates contacts 59 and 60.

Figure 6:
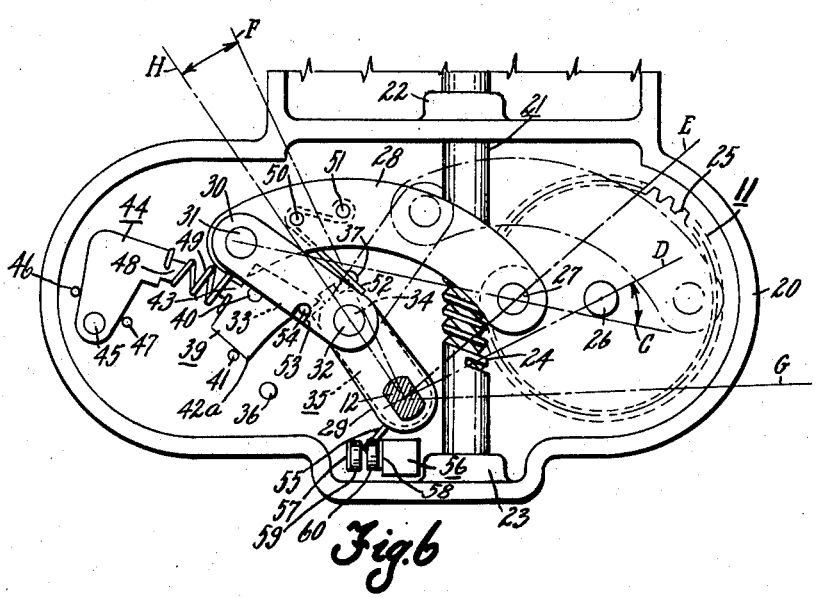
Fig. 6 is a view similar to Fig. 2, illustrating the mechanism in the parked position.

In Figures 2 and 4 the operating element 44 and locating element 39 are shown in the running position. With reference to Figs. 5 and 6, it may be seen that the operating element 44 has been moved into engagement with stop pin 46, which constitutes the parking position thereof. Pivotal movement of the element 44 into engagement with stop pin 46 will result in pivotal movement of the locating element 39 into engagement with stop pin 41, which constitutes the parking position thereof. Referring again to Figures 2 and 4, it may be seen that in the running position of locating element 39, end portion 42a of the concave surface engages the lug 38 to thereby retain the link 35 against the stop pin 36 during rotation of the driving member 25. When the locating and retaining element 39 is moved from the running position of Fig. 4 to the parking position of Fig. 5, end 42a thereof is moved out of engagement with the lug 38 of the link 35 so as to free the link for movement due to the forces produced by the connecting rod 28 during rotation of the worm wheel 25. Accordingly, during movement of the connecting rod from the position of Fig. 4 to the position of Fig. 5, or between the dead center positions of the connecting rod, the link 35 will move in a clockwise direction about the shaft 12 to the position of Fig. 5, and in so moving, it will displace the element 39 until it engages stop pin 37, at which time, the end portion 42b of the element 39 will engage the lug 38 so as to retain the lever in the position shown in Fig. 5. In this manner the movable pivot point 34 of the adjusting link is displaced and the compound linkage is adjusted so as to vary the amplitude of oscillation imparted to the driven shaft 12. During movement of the connecting rod from the position of Fig. 4 to the position of Fig. 5, it will be noted that the shaft 12 is only oscillated to the position indicated by line E of Fig. 5, or approximately throughout one-half of the normal wiping stroke. The normal wiping stroke is indicated by the angular distance between lines F of Fig. 4, and G of Fig. 2. However, during movement of the connecting rod 28 from the position of Fig. 5 to the full line position of Fig. 6, the amplitude of oscillation imparted to the driven shaft 12 adjacent one end of the stroke is increased, or varied, as indicated by the angular distance between lines F and H of Fig. 6. This additional movement, between 10° and 15°, is sufficient to position the wiper blades 18 and 19 in contiguous reationship with the windshield cowl structure, not shown. Concurrently with movement of the shaft 12 to the position denoted by line H, the pin 55 will engage leaf spring 58 thereby separating contacts 59 and 60 of the parking switch 56. Continued rotation of the worm wheel 25 due to coasting motor inertia, however, will not displace the driven shaft 12, inasmuch as the pivot points 32 and 34 of the operating and setting links 30 and 33 are axially aligned, such that continued rotation of the driving member 25 merely causes the links 30 and 33 to swing, or pivot, about their coinciding, axially aligned centers of the pivot points 32 and 34 during movement of the connecting rod between the full and dotted line positions of Fig. 6.

Thus, when the axial centers of the bearings, or pivot points, 32 and 34 are brought into axial alignment, as illustrated in Fig. 6, the two links 30 and 33 will swing about these pivot points as their common bearing connection, or pivot, at 31 is moved by the connecting rod 28. Thus, the linkage may be said to be in the neutral, or "declutched," position wherein the links 30 and 33 may swing freely without imparting movement to the driven shaft 12. The advantages of this mechanism are readily apparent inasmuch as the wiper blades may be driven to the parked position, and, thereafter, the electric motor may be deenergized and freely coast to a standstill without altering the parked position of the wiper blades. Accordingly, this arrangement obviates the necessity for a clutch, and further overcomes the problems encountered in attempting to park the wiper blades by coasting motor inertia due to varying surface conditions of the windshield.

In displacing the movable pivot point 34 of the adjusting link 33 from the position of Fig. 4 to the position of Fig. 6, it may be seen that the angular relationship between lines C and D is varied, so as to vary the amplitude of oscillation imparted to the driven member 12 by the angular distance between lines F and H. Moreover, to assure that the centers of bearings of pivot points 32 and 34 will be maintained in axial alignment when the link 35 is in the position of Fig. 6, the pin 54 of the setting link 33 is received in the slot 53 of the operating link 30.

Figure 8:
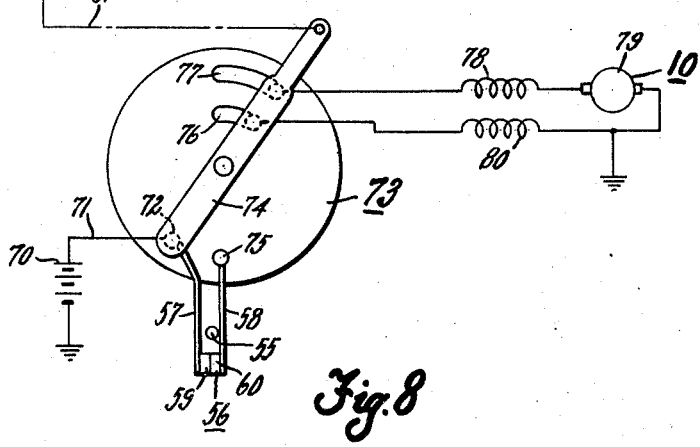
Fig. 8 is a schematic diagram of an electric circuit and switch means for controlling the wiper mechanism.

With particular reference to Fig. 8, a typical circuit arrangement for energizing the motor 10 will be described. The circuit may include a battery 70, one terminal of which is connected to ground and the other terminal of which is connected by a conductor 71 to a contact 72 of a manually operable switch 73. The switch 73 includes an angularly movable contact member 74, which is engageable with the contact 72, and with contacts 75, 76 and 77. Contact 72 is electrically connected to the leaf spring 57 carrying the contact 59 of the parking switch 56. Contact 75 is electrically connected to the leaf spring 58, which carries the contact 60 of the parking switch. Contact 77 is connected through the series field winding 78 of the electric motor 10 to the armature 79 thereof, the other side of the armature being connected to ground. Contact 76 is connected to the shunt field winding 80 of the electric motor 10, the other end of the shunt field winding being connected to ground.

Figure 7:
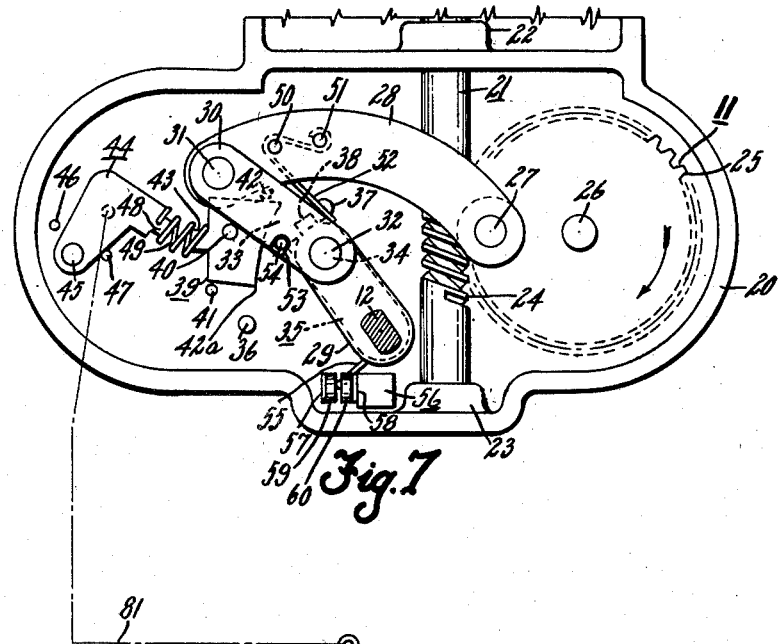
Fig. 7 is a view similar to Fig. 2, illustrating the mechanism going from the parked position into the running position.

The rotary bridging member 74 may also be connected by a linkage indicated by the dash line 81 to the operating element 44, Fig. 7, disposed within the motion converting mechanism housing 20. This interconnection 81 may take the form of a Bowden wire, such that when movement is imparted to the bridging member 74, movement will, likewise, be imparted to the operating element 44. Any suitable speed control means may be provided for the electric motor 10, such as interposing a variable resistance in series with the shunt field winding 80, as is well known in the art. The switch 73 is indicated in the "on" position in Fig. 8, in which the bridging member 74 engages contacts 72, 76 and 77. When the bridging member is moved to the "off" position, it engages contacts 75, 76 and 77, from which it may be seen that the parking switch 56 is rendered operable to control energization of the motor 10. Moreover, when the bridging member 74 is in the "on" position of Fig. 8, the operating element 44 is moved against stop pin 47, while when the bridging member 74 is in the "off" position, that is engaging contact 75, the operating element 44 is moved to the parking position against stop pin 46, as is shown in Figs. 5 and 6.

*Operation*

Assuming the wiper blades to be in the parked position against the cowl of a windshield, not shown, a complete cycle of wiper operation will be described. When the operator moves the contact member 74 to the position shown in Fig. 8, the electric motor 10 will be energized and movement will be imparted to the operating element 44 so as to move the operating element from the position of Fig. 6 to the position of Fig. 7. Rotation of the worm wheel 25 by the shaft 21 in the direction indicated by the arrow in Fig. 7 will impart movement to the connecting rod 28. Inasmuch as the operating element has been moved into engagement with stop pin 47, the retaining element 39 will be moved into engagement with stop pin 42, as is shown in Fig. 7. Accordingly, during movement of the connecting rod 28, the spring 52, which is adapted to engage the adjusting link 33 (Figs. 6 and 7), will urge the adjusting link 33 and the lever 35 in a counterclockwise direction, so that during continued rotation of the driving member 25, forces will be imparted to the link 35 through the adjusting link 33 so as to move the link 35 from the position of Fig. 7 to the position of Fig. 2. When link 35 is moved to the position of Fig. 2, the end portion 42a of the retaining element 39 will restrain the link 35 against further movement by reason of its engaging stop pin 36. Accordingly, rotation of the driving member 25 will impart oscillatory motion to the driven member 12 of fixed amplitude. In this manner the shaft 12 will be moved between the lines F and G, as indicated in Figs. 2, 4 and 6.

When the operator desires to stop wiper operation and park the wiper blades, he need only manipulate a control knob, not shown, so as to move the bridging member 74 of the switch 73 into engagement with contact 75. Inasmuch as the parking switch 56 is closed, the motor 10 will continue to be energized, and the operating and locating elements will be moved from the position of Figs. 2 and 4 to the position of Fig. 5 through the linkage 81. Accordingly, the link 35 is freed for clockwise rotation relative to the shaft 12, the force for rotating the link 35 being derived from the driving member 25. Consequently, rotation of the worm wheel 25 from the position of Fig. 4 to the position of Fig. 5 will move the link 35 into engagement with stop pin 37 where it will be retained by edge portion 42b of the retaining element 39. During this movement, the operating shaft 12 is moved to the position E and upon continued rotation of the driving member to the full line position of Fig. 6, the oscillating shaft 12 is moved to the position indicating by line H, and the wiper blades 18 and 19 are accordingly moved to the parked position. As stated hereinbefore, the amplitude of oscillation imparted to the shaft 12 is increased, or varied, adjacent one end of its normal stroke by displacing the movable pivot point 34 of the adjusting link 33.

When the blades have reached their parked position, as indicated by the line H in Fig. 6, the pin 55 will separate contacts 59 and 60 of the parking switch and, accordingly, the motor 10 will be deenergized. The motor 10 and the worm wheel 25 are then free to coast to a standstill without altering the parked position of the wiper blades inasmuch as the links 30 and 33 will merely swing about their axially aligned bearing centers 32 and 34, due to the application of a swinging force being applied to their common pivot connection 31 by the connecting rod 28.

From the foregoing it is manifest that this invention provides power driven windshield wiper actuating mechanism wherein the wiper blades are driven into a parked position out of the normal range of vision, and retained in such position, while the rotary driving means therefor coast to a standstill. It will further be appreciated that the mechanism herein disclosed is of exceedingly simple design and, accordingly, the production cost thereof should not be prohibitive. Moreover, the control mechanism is exceedingly simple to operate and is not subject to malfunctioning. In addition, the wiper blades will automatically be moved to the parked position upon movement of the control switch to the "off" position, thereby obviating the necessity for critical manipulations of the control switch, as has heretofore been necessary with power driven wiper apparatus in which the wiper blades are parked.

While the embodiment of the present invention as herein disclosed, constitutes a preferred form, it is to be understood that other forms might be adopted.

What is claimed is as follows:

1. In a mechanical movement of the character described, a member mounted to be alternately oscillated, a movable operating link connected at one end to oscillate said member, an adjusting link movably connected at the other end of said operating link, means applying swinging force to said links substantially at the point of movable connection therebetween, a movable pivot connection for the free end of said adjusting link, retaining means engageable with said movable pivot connection for maintaining said pivot connection in a first position wherein said member has imparted thereto oscillation of fixed amplitude, and means for releasing said retaining means so as to free said movable pivot connection for automatic movement from said first position to a second position by the swinging force applied to said links whereby the amplitude of oscillation imparted to said member may be varied.

2. In a mechanical movement of the character described, a member mounted to be alternately oscillated, a movable operating link connected at one end to oscillate said member, an adjusting link movably connected at the other end of said operating link, means applying swinging force to said links, a movable pivot connection for the free end of said adjusting link, retaining means engageable with said movable pivot connection for maintaining the said pivot connection in a first position wherein said member has imparted thereto oscillation of fixed amplitude and means for releasing said retaining means so as to free said movable pivot connection for automatic movement from said first position to a second position by the swinging force applied to said links wherein said movable pivot connection is positioned in axial alignment with the connection between said operating link and said member whereby the application of swinging force to said operating link will impart no movement to said member.

3. In a mechanical movement of the character described, a rotatable driving member, an oscillatable driven member, means interconnecting said members capable of imparting oscillation to said driven member upon rotation of said driving member, and manually controllable means for freeing said interconnecting means for automatic adjustment due to movement of the interconnecting means by rotation of said driving member to preclude oscillatory movement of the driven member upon rotation of the driving member.

4. In a mechanical movement of the character described, a rotatable driving member, an oscillatable driven member, means interconnecting said members for imparting oscillation to said driven member upon rotation of said driving member, and means for freeing said interconnecting means for automatic adjustment due to movement of the interconnecting means by rotation of said driving member to vary the amplitude of oscillation imparted to said driven member.

5. In a mechanical movement of the character described, a rotatable driving member, an oscillatable driven member, means interconnecting said members for imparting oscillatory movement of fixed amplitude to said driven member upon rotation of said driving member, and manually controllable means for freeing said interconnecting means for automatic adjustment due to movement of the interconnecting means by rotation of said driving member to vary the amplitude of oscillatory movement imparted to said driven member at one end of its stroke and thereafter maintain said driven member stationary during continued rotation of the driving member.

6. Means for oscillating a shaft, comprising in combination, an arm attached to said shaft and extending therefrom, a rotatable crank member, a connecting rod having one end pivotally connected to said crank, an operating link pivotally connected at one end to said arm, the other ends of said operating link and said connecting rod being pivotally interconnected whereby a swinging force is applied to said operating link by said connecting rod during rotation of said crank member, an adjusting link swingably connected at one end to the pivotal connection between the connecting rod and the operating link, a movable pivot connection for the other end of said adjusting link, means carrying said movable pivot point connection, and means operatively associated with the last recited means for selectively freeing, or restraining, said pivot point carrying means for automatic movement from a first position to a second position by the swinging force applied to said lings by said connecting rod whereby the amplitude of oscillation imparted to said shaft may be varied.

7. In a mechanical movement of the character described, a rotatable driving member, an oscillatable driven member, means operatively interconnecting said members constructed and arranged to impart oscillation to said driven member upon rotation of said driving member, said interconnecting means including a connecting rod and an adjusting link having a common point of pivotal interconnection, a movable pivot point connection for said adjusting link, and means operatively associated with said movable pivot point connection for freeing said movable pivot point connection for automatic movement from a first position to a second position by the forces imparted to said adjusting link by said connecting rod whereby said interconnecting means is rendered inoperative to impart oscillation to said driven member upon rotation of said driving member.

8. Windshield wiper actuating mechanism including in combination, a rotatable driving member, an oscillatable driven member, means interconnecting said members capable of imparting oscillation to said driven member upon rotation of said driving member, means operatively associated with said interconnecting means for freeing said interconnecting means for automatic adjustment due to movement of the interconnecting means by rotation of said driving member so as to prevent oscillatory movement of the driven member upon rotation of the driving member, and manually operable means for controlling the operation of said adjusting means.

9. Windshield wiper actuating mechanism including in combination, a rotatable driving member, an oscillatable driven member, a connecting rod having pivotal connection at one end to said driving member, a link having one end pivotally connected to the other end of said connecting rod, and means operatively interconnecting the other end of said link and said driven member whereby rotation of the driving member will impart oscillation to the driven member, and manually controllable means operatively associated with said interconnecting means for freeing said interconnecting means for automatic adjustment due to movement of the interconnecting means by rotation of said driving member for automatically varying the amplitude of oscillation imparted to said driven member and thereafter precluding movement of the driven member during continued rotation of the driving member.

10. Windshield wiper actuating mechanism including in combination, a rotatable driving member, an oscillatable driven member, a connecting rod having one end pivotally connected to said driving member at a point displaced from the axis thereof, a link having one end pivotally connected to the other end of said connecting rod, an arm attached to said driven member and extending therefrom, the free end of said arm and the other end of said link being pivotally interconnected whereby rotation of the driving member will impart oscillation to said driven member, and manually controllable means operatively associated with said connecting rod and said link for freeing said connecting rod and said link for automatic adjustment due to swinging movement of said connecting rod by rotation of said driving member for automatically varying the amplitude of oscillation imparted to said driven member and thereafter precluding movement of the driven member during continued rotation of the driving member.

11. Windshield wiper actuating mechanism including in combination, a rotatable driving member, an oscillatable driven member, a connecting rod having one end pivotally connected to said driving member, an operating link having one end pivotally connected to the other end of said connecting rod, an arm attached to said driven member and extending therefrom, the free end of said arm and the other end of said operating link being pivotally interconnected whereby rotation of the driving member will impart oscillation to the driven member, an adjusting link having one end pivotally connected at the point of interconnection between the connecting rod and the operating link, a movable pivot point for the other end of said adjusting link, a link supported for rotation about said driven member and carrying said movable pivot point, and means operatively associated with said last recited link for freeing said last recited link for automatic movement from a first position to a second position due to the forces produced by rotation of said driving member whereby the position of said movable pivot point is varied so as to vary the amplitude of oscillation imparted to said driven member.

12. Windshield wiper actuating mechanism including in combination, a rotatable driving member, an oscillatable driven member, a connecting rod having one end pivotally connected to said driving member, an operating link having one end pivotally connected to the other end of said connecting rod, an arm attached to said driven member and extending therefrom, the free end of said arm and the other end of said operating link being pivotally interconnected whereby rotation of the driving member will impart oscillation to the driven member, an adjusting link having one end pivotally connected at the point of interconnection between the connecting rod and the operating link, a movable pivot point for the other end of said adjusting link, a link supported for rotation about said driven member and carrying said movable pivot point, means operatively associated with said last recited link for restraining the said last recited link against movement by the forces produced due to rotation of said driving member whereby oscillatory movement of fixed amplitude will be imparted to the driven member upon rotation of the driving member, and means for adjusting said last recited means so as to free said last recited link for automatic movement from a first position to a second position due to the forces produced by rotation of said driving member so as to displace said movable pivot point and thereby vary the amplitude of oscillation imparted to the driven member upon rotation of the driving member.

13. Windshield wiper actuating mechanism including in combination, a rotatable driving member, an oscillatable driven member, a connecting rod having one end pivotally connected to said driving member, an operating link having one end pivotally connected to the other end of said connecting rod, an arm attached to said driven member and extending therefrom, the free end of said arm and the other end of said operating link being pivotally interconnected whereby rotation of the driving member will impart oscillation to the driven member, an adjusting link having one end pivotally connected at the point of interconnection between the connecting rod and the operating link, a movable pivot point for the other end of said adjusting link, a link supported for rotation about said driven member and carrying said movable pivot point, means operatively associated with said last recited link for freeing said last recited link for automatic movement by the forces produced due to rotation of said driving member, and means engageable with said last recited link for limiting movement thereof due to the forces produced by rotation of said driving member when the movable pivot point is located so that the pivotal connection between the arm and the operating link is in axial alignment therewith during rotation of the driving member whereby the driven member will remain stationary during continued rotation of the driving member.

14. Windshield wiper actuating mechanism including in combination, a rotatable driving member, an oscillatable driven member, means interconnecting said members for imparting oscillation to said driven member upon rotation of said driving member, manually controllable means operatively associated with said interconnecting means for freeing said interconnecting means for automatic adjustment due to movement of the interconnecting means by rotation of said driving member to vary the amplitude of oscillatory movement of the driven member at one end of its stroke during rotation of the driving member, and means actuated upon adjustment of said interconnecting means so as to vary the amplitude of oscillatory movement of said driven member for interrupting the application of torque to said driving member.

15. Windshield wiper actuating mechanism including in combination, a rotatable driving member, an oscillatable driven member, means interconnecting said members including an operating link for imparting oscillation to said driven member upon rotation of said driving member, an adjusting link having one end pivotally connected to said operating link, the other end of said adjusting link having a movable pivot point connection, means for freeing said pivot point connection for automatic displacement due to the forces produced by rotation of the driving member so that said driven member remains stationary during rotation of the driving member, and means operable to interrupt the application of torque to said driving member when the movable pivot point connection of the adjusting link is positioned so as to maintain the driven member stationary during rotation of the driving member.

16. Windshield wiper actuating mechanism including in combination, a rotatable driving member, an oscillatable driven member, an electric motor operatively connected to said driving member for effecting rotation thereof, means interconnecting said members capable of imparting oscillation to said driven member upon rotation of said driving member, manually controllable means operatively associated with said interconnecting means and actuated by rotation of said driven member for automatically adjusting the said interconnecting means to preclude oscillatory movement of the driven member upon rotation of the driving member, and switch means automatically operable to deenergize said motor when said interconnecting means are adjusted so as to preclude oscillatory movement of the driven member upon rotation of the driving member.

17. Windshield wiper actuating mechanism including in combination, a rotatable driving member, an oscillatable driven member, means interconnecting said members capable of imparting oscillation to the driven member upon rotation of the driving member, manually controllable means operatively associated with said interconnecting means and operable by rotation of the driven member for automatically adjusting the said interconnecting means so as to increase the amplitude of oscillation imparted to said driven member at one end of its stroke and thereafter maintain the driven member stationary during continued rotation of the driving member, an electric motor operatively connected to said driving member for effecting rotation thereof, switch means for controlling the energization of said electric motor, and means operable to open said switch means when the amplitude of oscillation imparted to said driven member is increased at one end of its stroke.

18. Windshield wiper actuating mechanism including in combination, a rotatable driving member, an electric motor operatively connected to said driving member for effecting rotation thereof, an oscillatable driven member, means interconnecting said members for imparting oscillation of predetermined magnitude to said driven member upon rotation of said driving member, manually controllable means operatively associated with said interconnecting means and operable by rotation of said driving member for automatically adjusting said interconnecting means so as to increase the amplitude of oscillation imparted to said driven member at one end of its normal stroke and thereafter prevent movement of said driven member during continued rotation of the driving member, a manual switch for starting and stopping said motor, and an automatic switch effective to deenergize said motor when the manual switch is open, the construction and arrangement being such that said automatic switch is only operable to deenergize said motor when the driven member is stationary.

19. Windshield wiper actuating mechanism including in combination, a rotatable driving member, an oscillatable driven member, a unidirectional electric motor operatively connected to said driving member for effecting rotation thereof, a connecting rod pivotally connected at one end to said driving member, an operating link pivotally connected to the other end of said connecting rod, means operatively interconnecting the other end of said operating link and said driven member whereby rotation of the driving member will impart oscillation to the driven member, an adjusting link having one end pivotally connected to the operating link and the connecting rod at the point of pivotal connection therebetween, a movable pivot point for the other end of said adjusting link, means carrying said movable pivot point for the adjusting link and automatically movable between predetermined positions due to the forces produced by said driving member, means operatively associated with said last recited means for freeing said last recited means for movement due to rotation of the driving member whereby the movable pivot point is displaced so that the amplitude of oscillation imparted to the driving member by the driven member is varied, switch means for controlling the energization of said electric motor, and means carried by said driven member and operable to open said switch means and deenergize said motor when the amplitude of oscillation imparted to said driven member is varied due to the displacement of said movable pivot point of the adjusting link.

References Cited in the file of this patent

UNITED STATES PATENTS

| | | |
|---|---|---|
| 2,403,233 | Patch | July 2, 1946 |
| 2,452,496 | Schneider | Oct. 26, 1948 |